US012761610B2

(12) United States Patent
Chauvicourt

(10) Patent No.: US 12,761,610 B2
(45) Date of Patent: Oct. 13, 2026

(54) SYSTEM AND METHOD OF PREDICTING BEHAVIOR OF ELECTRIC MACHINES

(71) Applicant: Siemens Industry Software NV, Leuven (BE)

(72) Inventor: Fabien Chauvicourt, Kessel Lo (BE)

(73) Assignee: Siemens Industry Software NV, Leuven (BE)

( * ) Notice: Subject to any disclaimer, the term of this patent is extended or adjusted under 35 U.S.C. 154(b) by 625 days.

(21) Appl. No.: 18/279,564

(22) PCT Filed: Mar. 4, 2021

(86) PCT No.: PCT/EP2021/055484
§ 371 (c)(1),
(2) Date: Aug. 30, 2023

(87) PCT Pub. No.: WO2022/184260
PCT Pub. Date: Sep. 9, 2022

(65) Prior Publication Data
US 2024/0302804 A1 Sep. 12, 2024

(51) Int. Cl.
*G05B 13/02* (2006.01)
*G05B 13/04* (2006.01)

(52) U.S. Cl.
CPC ......... *G05B 13/027* (2013.01); *G05B 13/048* (2013.01)

(58) Field of Classification Search
CPC ..................................................... G05B 13/027
See application file for complete search history.

(56) References Cited

FOREIGN PATENT DOCUMENTS

CN 108763690 A 11/2018

OTHER PUBLICATIONS

Chauvicourt, F., S. Ciceo, and H. Van der Auweraer. "On the use of vibration synthesis to ease electric machine powertrain design." 2019 IEEE International Electric Machines & Drives Conference (IEMDC). IEEE, 2019. pp. 1118-1125.
Ibrahim, Issah, et al. "Surrogate-based acoustic noise prediction of electric motors." IEEE Transactions on Magnetics 56.2 (2020): pp. 1-4.
International Search Report and Written Opinion for International application No. PCT/EP2021/055484 mailed Oct. 27, 2021, pp. 1-26.

(Continued)

*Primary Examiner* — David E Choi
(74) *Attorney, Agent, or Firm* — Lempia Summerfield Katz LLC

(57) ABSTRACT

A system and method of predicting behavior of at least one electric machine is provided, wherein the method includes: generating a simulated-dataset including simulated design results, (e.g., individually), for electromagnetic properties, structural properties, and acoustic properties of the electric machine, wherein the simulated-dataset is generated by simulating at least one operating condition of the electric machine on parametric models generated from design parameters of the electric machine; training artificial neural network models using the design parameters and the simulated design results output from the parametric models in response to at least one operating condition of the electric machine; and predicting behavior of the electric machine by orchestrating execution of the artificial neural network models for custom design parameters.

18 Claims, 4 Drawing Sheets

(56) References Cited

OTHER PUBLICATIONS

Le Besnerais, J. "Fast prediction of variable-speed acoustic noise due to magnetic forces in electrical machines." 2016 XXII International Conference on Electrical Machines (ICEM). IEEE, 2016, pp. 1-8.

Tahkola, Mikko, et al. "Surrogate modeling of electrical machine torque using artificial neural networks." IEEE Access 8 (2020): pp. 220027-220045.

SYSTEM AND METHOD OF PREDICTING BEHAVIOR OF ELECTRIC MACHINES

The present patent document is a § 371 nationalization of PCT Application Serial No. PCT/EP2021/055484, filed Mar. 4, 2021, designating the United States, which is hereby incorporated by reference.

TECHNICAL FIELD

The present disclosure relates to predicting behavior of electric machines. Particularly, the present disclosure is directed towards predicting the behavior of electric machines during the initial design stage of the lifecycle of the electric machines.

BACKGROUND

Electric machines involve multiple components that interact with each other. Predicting behavior of the electric machines is complicated in view of the multiple components and the associated physical domains. For example, noise and vibration (NV) of electric machines may be decomposed as a combination of magnetic, aerodynamic, and mechanical sources. Magnetic noise is commonly considered as one of the most critical due to its induced high tonal components associated to high frequencies. Predicting the NV generated by magnetic sources is challenging because of the multi-physicality nature of the magnetic sources. Example electric machines such as a gearbox and an inverter for traction motors in the automotive sector have multiple interacting components and multiple physical domains.

The challenge is increased when the prediction has to be performed during the early design stage of an electric machine. The prediction may require interaction of electromagnetic models, structural models, and acoustic models. The interaction of multiple domain models is complex and therefore results in performing noise and vibration behavior analysis at a later stage of the design life cycle.

Consequently, time-to-market may be significantly increased when the noise and vibration behavior analysis indicates a design error. Doing the noise and vibration behavior analysis at a later stage may require designers to redo steps in the design lifecycle and re-think the entire design. Accordingly, improvements in the prediction of the electric machine behavior are desirable.

SUMMARY AND DESCRIPTION

The object of the present disclosure is to enable fast and accurate early-design stage behavior prediction for electric machines. In particular, the present disclosure aims to avoid redesign of the electric machines.

The scope of the present disclosure is defined solely by the appended claims and is not affected to any degree by the statements within this summary. The present embodiments may obviate one or more of the drawbacks or limitations in the related art.

The object of the present disclosure is achieved, for example, by a computer implemented method of predicting behavior of at least one electric machine. The method includes generating a simulated-dataset including simulated design results, (e.g., individually), for electromagnetic properties, structural properties, and acoustic properties of the electric machine, wherein the simulated-dataset is generated by simulating at least one operating condition of the electric machine on parametric models generated from design parameters of the electric machine. The method further includes training artificial neural network models using the design parameters and the simulated design results output from the parametric models in response to at least one operating condition of the electric machine. The method further includes predicting behavior of the electric machine by orchestrating execution of the artificial neural network models for custom design parameters.

The object is also achieved by a system for predicting behavior of at least one electric machine. The apparatus includes a processor and a memory communicatively coupled to the processor. The memory includes: a simulation module, when executed by the processor, configured to generate a simulated-dataset including simulated design results, (e.g., individually), for electromagnetic properties, structural properties, and acoustic properties of the electric machine, wherein the simulated-dataset is generated by simulating at least one operating condition of the electric machine on parametric models generated from design parameters of the electric machine. The memory further includes a learning module, when executed by the processor, configured to train artificial neural network models using the simulated design results and an output of the parametric models for the at least one operating condition of the electric machine. The memory further includes a prediction module, when executed by the processor, configured to predict behavior of the electric machine by orchestrating execution of the artificial neural network models for custom design parameters.

A further example may include a non-transitory computer readable medium encoded with executable instructions (such as a software component on a storage device) that when executed, causes at least one processor to carry out this described method.

The present disclosure is advantageous over the prior-art methods in the physical model formulation with higher accuracy in view of number of input parameters in the parametric model. Further, the present disclosure establishes a data-driven framework that uses data coming from high-fidelity parametric models. The combination of the parametric models and the artificial neural network models (ANNs) enables more stochasticity and higher accuracy yet fulfilling computational speed requirements.

Accordingly, the present disclosure enables much faster early-design stage behavior prediction for electric machines, particularly noise and vibration behavior prediction. The advantage is achieved by the ANNs that enable creation of data-driven surrogate models which frontload all the time-consuming calculations. Furthermore, the present disclosure keeps the same accuracy using the high-fidelity parametric models instead of assumptions that affect the accuracy of the behavior prediction. This implies that high degrees of complexity may also be included early in the design cycle with the proposed disclosure. A logical consequence of the present disclosure is the reduction in time and resource required to design electric machines. The present disclosure would not only allow the designer/customer to design faster, but it would also allow the designer to avoid going backwards in the design cycle.

The terms "electromagnetic properties," "structural properties," and "acoustic properties" relate to properties or attributes of the electric machine that relate to electromagnetic, structural, and acoustic domains, respectively. The properties/attributes of the electric machine may be changed by changing the design parameters of the electric machine during the design cycle of the electric machine. The design parameters include electromagnetic design parameters, structural design parameters, and acoustic design parameters associated with the electromagnetic properties, the structural properties, and the acoustic properties of the electric machine.

Example design parameters include number of rotor poles, number of stator slots, winding layout, slot opening width, slot height, stator inner diameter, stator outer diameter, rotor outer diameter, skew type, skew angle, electromagnetic material properties (B-H curve, permeability) for steel sheets and permanent magnet elements, housing outer diameter, mechanical material properties (Young's modulus, Poisson ratio, mass density) for steel sheets, housing and permanent magnet elements and acoustic material properties (mass density) of the external fluids. The present disclosure improves the design cycle by accurately predicting the behavior of the electric machines based on the design parameters even at the early stage of design.

As used herein, "operating condition" of the electric machine refers to the expected conditions in which the electric machine will be operated. For example, the operating conditions include currents in the electric machine, power density, voltage, ambient pressure, ambient temperature, etc.

In an embodiment, the electric machine may belong to a fleet of electric machines whose design parameters may be stored in a library, referred to as a design dataset. The design dataset may be a bulky and may not be directly usable to generate the simulated-dataset. Accordingly, the method may include selecting the design parameters based on a sensitivity analysis of a design dataset of the electric machine, wherein the design dataset includes the design parameters of a class of the electric machine. Further, the system may include a parameter selection module, when executed by the processing unit, configured to select the design parameters based on a sensitivity analysis of the design dataset of the electric machine. The selection provides that the design parameters do not overload the simulations run on the parametric models. Therefore, the present disclosure advantageously reuses the design parameters that may be relevant to the electric machine, while providing that the simulations are not compute intensive.

As used herein "parametric models" refer to one of 2-Dimensional, 3-Dimensional, and 3-Dimensional Finite Element models generated from the electromagnetic design parameters, the structural design parameters, and the acoustic design parameters. The parametric models include an electromagnetic parametric model, a structural model, and an acoustic model. In an example, the electromagnetic parametric model may be a magnetostatic model. The structural parametric model may be a force response model. The acoustic parametric model may be a finite element boundary analysis and may include acoustic transfer analysis.

In an embodiment, the method may include generating the parametric models based on the electromagnetic design parameters, the structural design parameters, and the acoustic design parameters. Further, the system may include a model generator module, when executed by the processing unit, configured to generate the parametric models based on the electromagnetic design parameters, the structural design parameters, and the acoustic design parameters. By generating high-fidelity parametric models, the present disclosure advantageously provides that the simulations run on the parametric models generate accurate results.

The method may further include: generating the electromagnetic parametric model based on the electromagnetic design parameters including at least one of number of rotor poles, skewing angle, nonlinear B-H curve; generating the structural parametric model based on the structural design parameters including at least one of skewing geometry, stator diameter, housing geometry, welding lines; and generating the acoustic design parameters model based on the acoustic properties including at least one of acoustic pressure and housing geometry.

In other embodiments, a set parametric models associated with the electric machine may be available and stored in a model database. The model generator module of the system may be configured to determine the parametric models to retrieve from the model database. The determination of the parametric model may be based on the compute resources available to run simulations on the parametric models.

In an embodiment, the simulated-dataset is generated for each domain by running simulations individually on the electromagnetic parametric model, the structural parametric model, and the acoustic parametric model. Accordingly, the simulated-dataset includes simulated design results output when simulations are run on the electromagnetic parametric model, the structural parametric model, and the acoustic parametric model.

The method may include synthesizing the simulated design results from the electromagnetic design parameters by executing the electromagnetic parametric model for the at least one operating condition in the electric machine to generate the simulated design results including simulated force and simulated flux linkage, wherein the at least one operating condition is currents in the electric machine. The method may further include synthesizing the simulated design results from the structural design parameters by executing the structural parametric model for the simulated force to generate the simulated design results including simulated vibration and simulated displacement. The method may further include synthesizing the simulated design results from the acoustic design parameters by executing the acoustic parametric model for the simulated vibration and the simulated displacement to generate simulated design results including simulated acoustic response.

The simulated-dataset including the simulated design results from the parametric models is used to train and validate the ANNs. When the ANNs are trained, the present disclosure is capable of predicting behavior of the electric machines within one second from the input of custom design parameters by a designer. As used herein, the term "custom design parameters" may refer to the same or a subset of the design parameters that was used to train and validated the ANNs. In some embodiments, additional or new design parameters may be included in the custom design parameters. In such scenarios, the method acts from the generation of the simulated-dataset to the training of the ANNs are repeated for the new design parameters. The repeating/retraining may be performed in batches when a threshold number of new design parameters is exceeded. The designer may define the threshold number. For example, the custom design parameters includes the at least one of number of rotor poles, skewing angle, rotor notches, nonlinear B-H curve, skewing geometry, stator diameter, housing geometry, welding lines, acoustic pressure, and housing geometry.

The method may include predicting at least one of noise behavior and vibration behavior for the custom design parameters of the electric machine based on the orchestrated execution of the artificial neural network models. In an embodiment, to orchestrate the execution of ANNs, the method may include executing a first artificial neural network model with the custom design parameters as input and based on the currents in the electric machine, and simulated flux linkages determined using the electromagnetic parametric model to generate a predicted force. The method may further include executing a second artificial neural network model with the custom design parameters and the predicted force as input to generate a predicted vibration displacement. The method may further include executing a third artificial neural network model with the custom design parameters and the predicted vibration displacement as input to generate a predicted acoustic pressure.

In another embodiment, the method may advantageously include predicting the noise behavior and the vibration behavior for the custom design parameters of the electric machine based on at least one of the predicted force, the predicted vibration displacement, and the predicted acoustic pressure.

In an embodiment, the system may include a Graphical User Interface (GUI), communicatively coupled to the processing unit, configured to receive the custom design parameters for the electric machine, and wherein the GUI is configured to display the predicted behavior for the custom design parameters. Accordingly, the GUI is configured to display noise behavior and a vibration behavior of the electric machine within one second of the receipt of the custom design parameters, wherein the noise behavior and the vibration behavior are generated in response to the at least one operating condition of the electric machine.

The present disclosure advantageously retains the accuracy of the parametric models with a fast surrogate model generated using the ANNs. Accordingly, at the early-design stage the output of the GUI, maybe equivalent in amplitude and spectrum to simulation output of the parametric models.

BRIEF DESCRIPTION OF THE DRAWINGS

Below, the disclosure is described using the embodiments illustrated in the figures.

DETAILED DESCRIPTION

Figure 1:
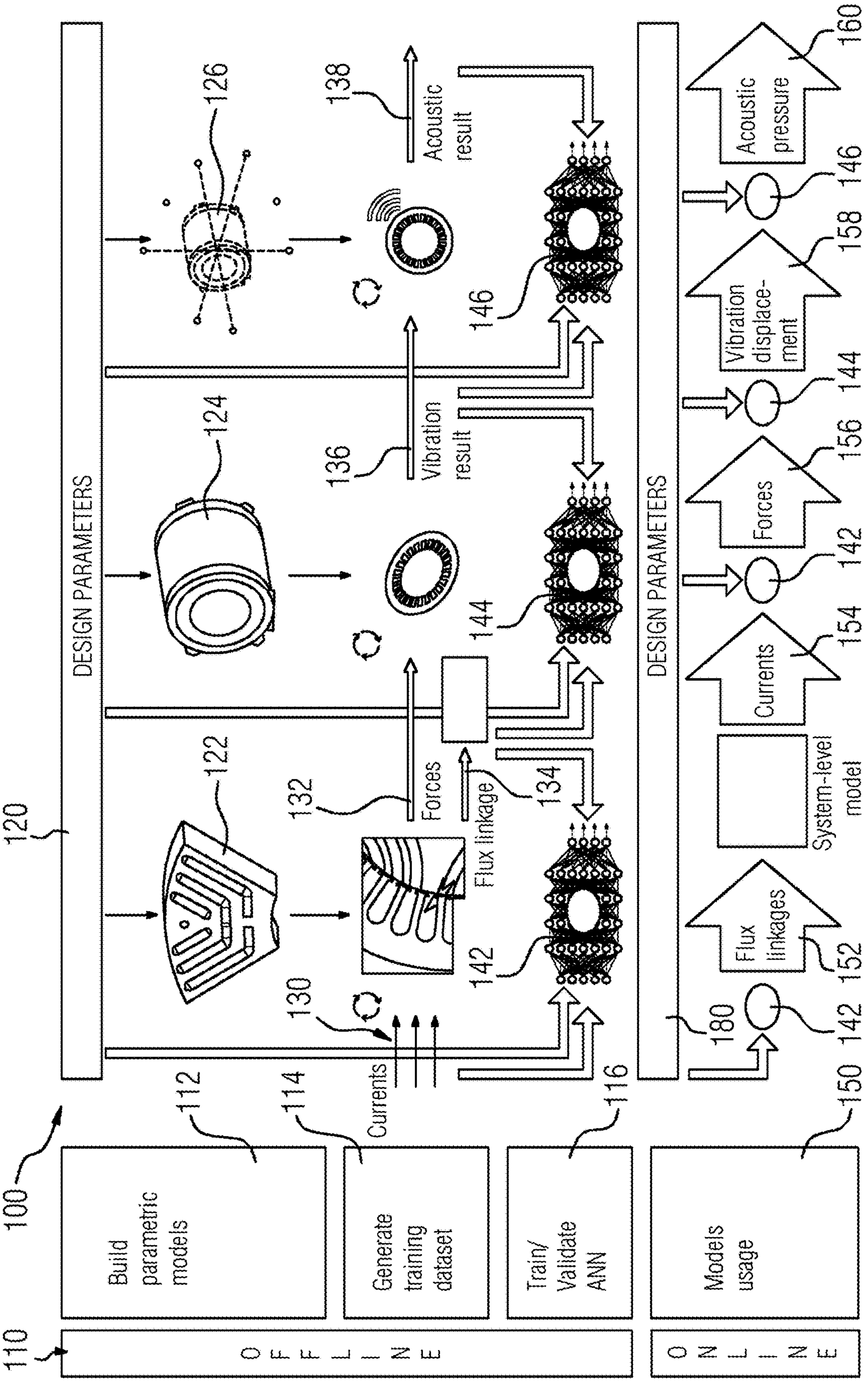
FIG. 1 illustrates stages of predicting behavior of electric machines according to an embodiment.

Hereinafter, embodiments for carrying out the present disclosure are described in detail. The various embodiments are described with reference to the drawings, wherein like reference numerals are used to refer to like elements throughout. In the following description, for purpose of explanation, numerous specific details are set forth in order to provide a thorough understanding of one or more embodiments. It may be evident that such embodiments may be practiced without these specific details.

FIG. 1 illustrates stages 110 and 150 of predicting behavior of electric machines according to an embodiment.

As shown in FIG. 1, the stages of predicting the behavior of electric machines may be split into offline stage 110 where the models are built and an online stage 150 where the models are used to conduct the predict the behavior in run-time.

According to an embodiment, the online stage 110 employs a mix of parametric high-fidelity models 122, 124, and 126 to generate training data for Machine Learning activities, particularly Artificial Neural Network (ANN) 142, 144, and 146. As shown in the offline stage 110, results of the parametric models 122, 124, and 126 (e.g., electromagnetic, structural, acoustic simulation-based surrogate models), are input to the ANN 142, 144, and 146 to generate the model used in the online stage 150. The combination of the parametric models 122, 124, and 126 with the ANN 142, 144, and 146 enable accurate and fast noise and vibration modelling of electric machines.

At act 112, the parametric models 122, 124, and 126 are built for electromagnetic, structural, and acoustic domains using the design parameters 120. The design parameters 120 may include electromagnetic design parameters, structural design parameters, and acoustic design parameters. Further, the parametric models may be one of 2-Dimensional, 3-Dimensional, and 3-Dimensional Finite Element models generated from the electromagnetic design parameters, the structural design parameters, and the acoustic design parameters.

In an embodiment, the design parameters 120 may include number of rotor poles, number of stator slots, winding layout, slot opening width, slot height, stator inner diameter, stator outer diameter, rotor outer diameter, skew type, skew angle, electromagnetic material properties (B-H curve, permeability) for steel sheets and permanent magnet elements, housing outer diameter, mechanical material properties (Young's modulus, poisson ratio, mass density) for steel sheets, housing and permanent magnet elements and acoustic material properties (mass density) of the external fluids.

The parametric models include an electromagnetic parametric model 122, a structural model 124 and an acoustic model 126. In an example, the electromagnetic parametric model 122 may be a magnetostatic model that may be frequency dependent. The magnetostatic model may include effects of moving components and accurately simulate the electric machine for the electromagnetic design parameters. The structural parametric model 124 may be a force response model that evaluates the dynamic forced responses of finite element structural model. The structural parametric model 124 may predict response of the electric machines to a set of applied transient, frequency (harmonic), random vibratory or shock spectrum loads. The acoustic parametric model 126 may be a finite element boundary analysis and may include acoustic transfer analysis.

At act 114, simulation-driven datasets 132, 134, 136, and 138 for the electromagnetic, structural, and acoustic domains are generated. The simulation-driven dataset is the output of the simulations executed by the parametric models 122, 124, and 126 with the design parameters 120 of the electric machines as input. The simulation-dataset includes simulated design results synthesized using the parametric models. For example, if the design parameters 120 include number of rotor poles, stator diameter, stack length, etc. The output simulation-datasets 132, 134, 136, and 138 are, for instance, magnetic flux density distribution in the airgap for the electromagnetic model, vibration displacement at a node for the structural model, and acoustic pressure for the acoustic model.

In an embodiment, the simulation-dataset including simulated force 132 and simulated flux linkage 134 are generated when currents 130 in the electric machines are input along with the design parameters 120 to the electromagnetic parametric model. Further, simulated vibration and displacement 136 are generated as output when the structural parametric model 124 is input with the design parameters 120 and the simulated force 132. Furthermore, simulated acoustic response 138 is generated as output when the acoustic parametric model 126 is input with the design parameters 120 and the simulated vibration and displacement 136.

At act 116, the ANN 142, 144, and 146 for the electromagnetic, structural, and acoustic domains are trained. The ANN 142, 144, and 146 are trained and validated using the design parameters and the simulated design results 132, 134, 136, and 138.

In the online stage 150, the trained ANNs 142, 144, and 146 separately or combined in order to assess the vibro-acoustic behavior of a specific electric machine. In an embodiment, the execution of the ANNs 142, 144, and 146 are orchestrated based on richness of the custom design parameters 180. Accordingly, custom design parameters 180 for the specific electric machine are input to the ANNs 142, 144, and 146 to predict vibration displacement and acoustic pressure. The ANNs 142, 144, and 146 may also be used as surrogate models of the parametric models 122, 124, and 126. Further, the ANNs 142, 144, and 146 may be used within system-level simulation models and are referred to as ID models.

As shown in FIG. 1, in the online stage 150, the ANN 142 is executed with the custom design parameters 180 as input and based on the currents 130 in the electric machine, to generate predicted flux linkages 152 and predicted force 156. In an embodiment, the current in the specific electric machine may be simulated current 154 determined using the electromagnetic parametric model to generate the predicted force 156. The ANN 144 is executed with the custom design parameters 180 and the predicted force 156 as input to generate a predicted vibration displacement 158. The ANN 146 is executed with the custom design parameters 180 and the predicted vibration displacement 158 as input to generate a predicted acoustic pressure 160.

Figure 2:
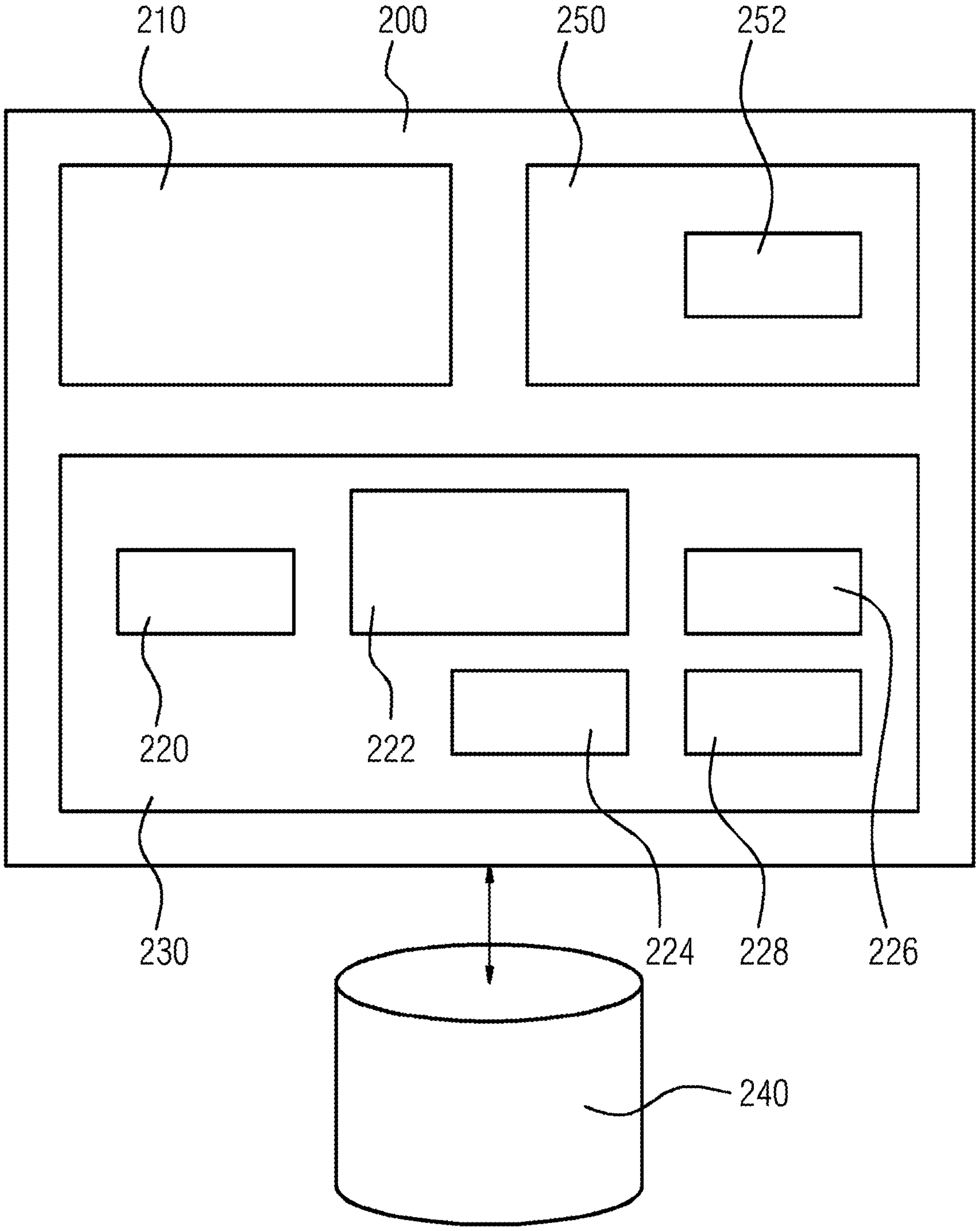
FIG. 2 illustrates a block diagram of a system for predicting behavior of electric machines, according to an embodiment.

FIG. 2 illustrates a block diagram of a system 200 for predicting behavior of electric machines, according to an embodiment. The system 200 includes a processing unit 210, a memory unit 230, and a display 250. The processing unit 210 is configured to execute computer implementable instructions stored as modules 220, 222, 224, 226, and 228 in the memory unit 230. Further, the display 250 is configured to display a Graphical User Interface (GUI) 252 to enable a user to interactively predict the behavior of the electric machines with customized design parameters.

The system 200 is communicatively coupled to a design database 240. The design database 240 stores a design dataset including design parameters that are relevant to a class of the electric machines, whose behavior prediction is performed. For example, the design dataset includes values for attributes such as number of rotor poles, number of stator slots, winding layout, slot opening width, slot height, stator inner diameter, stator outer diameter, rotor outer diameter, skew type, skew angle, electromagnetic material properties (B-H curve, permeability) for steel sheets and permanent magnet elements, housing outer diameter, mechanical material properties (Young's modulus, Poisson ratio, mass density) for steel sheets, housing and permanent magnet elements and acoustic material properties (mass density) of the external fluids. Furthermore, the design dataset may also include values for attributes such as advance angle, airgap diameter, airgap thickness, conductor length, coil span, phase connection, winding leakage inductance, conductor losses, lamination thickness, magnet angle, magnet radius, phase voltage, phase resistance, shaft diameter, etc.

In an embodiment, the system 200 may be configured to the select design parameters (such as the design parameters 120) from the design dataset. The selection of the design parameters (e.g., 120) may be achieved through sensitivity analysis conducted on the design dataset. The sensitivity analysis is used to determine whether deviations in the values for the attributes impact operation of the electric machines. In operation, the processor 210 executes a parameter selection module 220 in the memory unit 230 to select the design parameters from the design dataset. The system 200 may be configured to generate the parametric models (such as parametric models 122, 124, and 126) based on the design parameters (including electromagnetic design parameters, structural design parameters, and acoustic design parameters). In operation, the processor 210 executes a model generator module 222 stored in the memory unit 230.

The system 200 is configured to generate a simulated-dataset including simulated design results, (e.g., individually), for electromagnetic properties, structural properties, and acoustic properties of the electric machine. The processor 210 executes a simulation module 224 that generates the simulated-dataset by simulating at least one operating condition of the electric machine on the parametric models generated by the model generator module 222. Accordingly, the parametric models are input with electromagnetic design parameters and the operating condition, such as currents in the electric machine to generate the simulated electromagnetic design results. This is similarly performed to generate simulated structural design results and simulated acoustic design results as shown in act 114 of FIG. 1.

The system 200 is configured to train the artificial neural network models (142, 144, 146) using the simulated design results and an output of the parametric models for the at least one operating condition of the electric machine. The processor 210 executes a learning module 226 that includes instructions to train and validate artificial neural networks with the simulated electromagnetic design results, the simulated structural design results, and the simulated acoustic design results. The output of the learning model 226 results in ANNs that enable faster early-design stage through behavior prediction for electric machines. Particularly, the training and validation of the ANNs results in creation of data-driven surrogate models which frontload all the time-consuming analysis to predict the behavior. The system 200 is configured to predict behavior of the electric machine by orchestrating execution of the artificial neural network models for custom design parameters. The processor 210 executes a prediction module 228 that includes instruction on regarding execution of the ANNs in runtime when the custom design parameters are received via the GUI 252. The prediction module 228 may be configured to analyze the custom design parameters to determine which of the ANNs 142, 144, or 146 to execute.

As used herein, the term "custom design parameters" may refer to the same or a subset of the design parameters that was used to train and validated the ANNs. In some embodiments, additional or new design parameters may be included in the custom design parameters. The prediction module 228 is configured to determine the new design parameters and initiate retraining and validation of the ANNs by the learning module 226. In other embodiments, the model generator module 222 is triggered by the prediction module 228 to refine the parametric models. This in turn may trigger the simulation module 224 to refine the simulation-dataset and the learning module 226 to retrain the ANNs.

The system 200 may also be implemented using distributed computing resources. Further, the prediction of the behavior of the electric machines may be provided as a service via a cloud/an edge computing platform.

Figure 3:
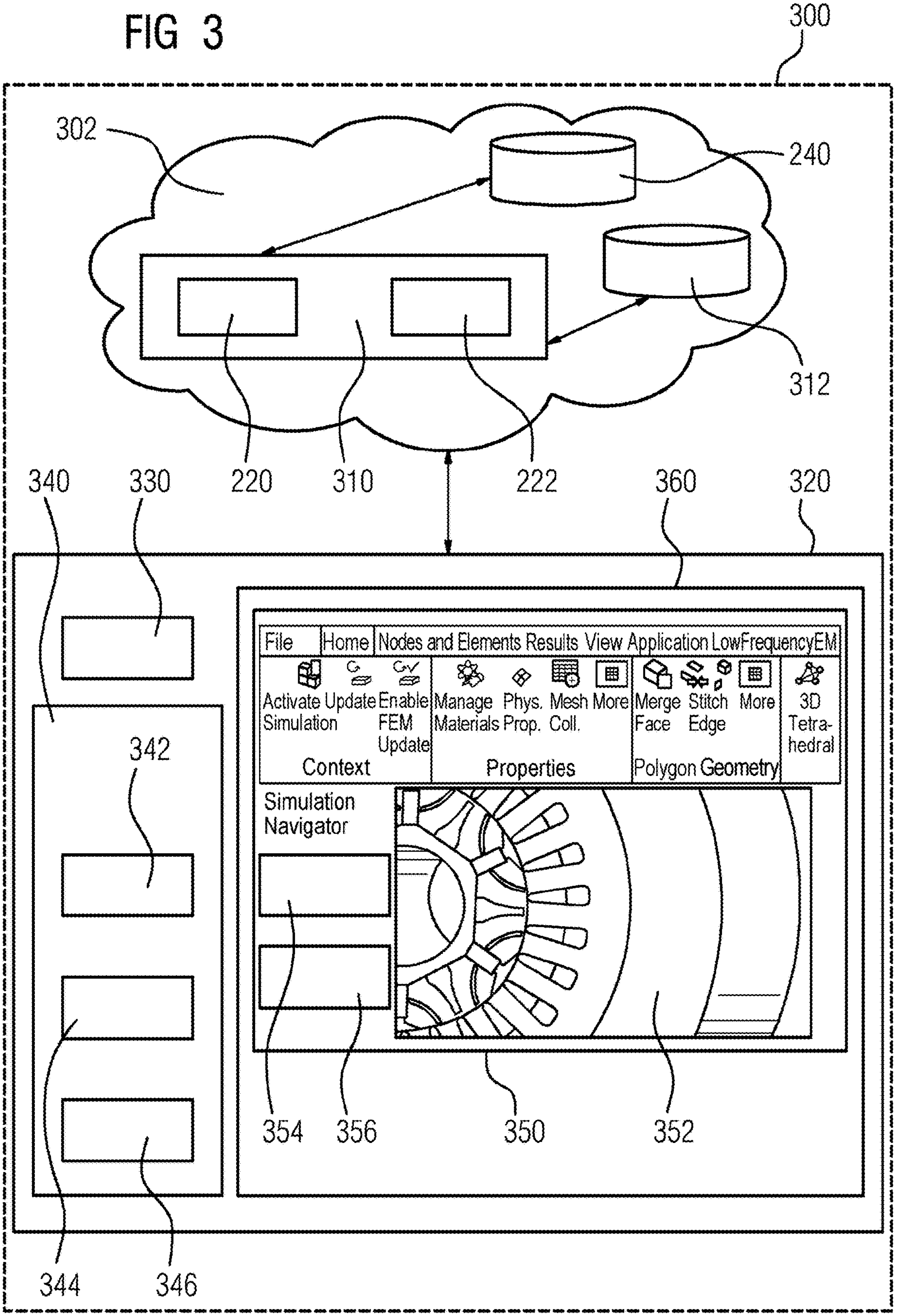
FIG. 3 illustrates a block diagram of a system for predicting behavior of electric machines, according to an embodiment.

FIG. 3 illustrates a block diagram of a system 300 for predicting behavior of electric machines, according to an embodiment.

The system 300 includes a cloud computing platform 302 configured to host a server 310, a model database 312 and the design database 240. The server 310 is configured to execute the parameter selection module 220 and the model generator module 222. The model database 312 includes historical versions of parametric models generated for the electric machines. In an embodiment, the electric machines may be associated with a class. The class of electric machines may already have associated parametric models. The model database is configured to access and store those historical versions.

The system 300 further includes a client device 320 at the user end configured to enable a user to interact with the system 300. The client device 320 includes a processor 330 and a memory unit 340 including a simulation module 342, a learning module 344, and a prediction module 346.

In operation, the parameter selection module 220 is configured to select design parameters from the design dataset stored in the design database 240. The design parameters are used by the model generator module 222 to generate the parametric models. In an embodiment, the model generator module 222 is configured to select and tune the models stored in the model database 312 to generate the parametric models.

The simulation module 342 is configured to receive a simulated-dataset including simulated design results when the parametric models are executed by the server 310. In an embodiment, the server 310 receives an Application Programming Interface (API) call requesting the simulated-dataset from the simulation module 342. In response to the API request, the parametric models are run with the design parameters as input and the simulated-dataset is transmitted as a response to the API request.

The learning module 344 is configured to train the ANNs and validate the ANNs using the simulated-dataset and the design parameters. In an embodiment, the learning module 344 may transmit an API call requesting for the design parameters from the parameter selection module 222 and another API call to the simulation module for the simulated-dataset. In response to the API request, the design parameters are transmitted to the learning module 344. The prediction module 346 is executed at the client device at run-time. Accordingly, prior to execution of the prediction module 346, the client device 320 is configured to display the parametric models and the design parameters. The client device 320 may include a display 360 or be communicatively coupled to a display. The display 360 is configured to display a GUI 350. The GUI 350 is an interactive design tool that enables a user to input custom design parameters and predict behavior of the electric machines.

As shown in FIG. 3, the GUI 350 includes multiple interactive sections 352, 354, and 356 along with standard simulation icons that perform certain functions when selected. The interactive sections 352, 354, and 356 includes a visual representation of the parametric models 352, a model configuration section 354, and a design parameter configuration section 356.

The GUI may already display the parametric models 352 with the associated model configuration 354. The displayed parametric models 352 and the configuration 354 may be generated by executing the model generator module 222 and the simulation module 342. A user may provide custom design parameters using the design parameter configuration section 356. When the custom design parameters are received, the processor 330 executes the prediction module 346. The prediction module 346 runs the ANNs with the custom design parameters as the input to predict the behavior of the electric machines.

Figure 4:
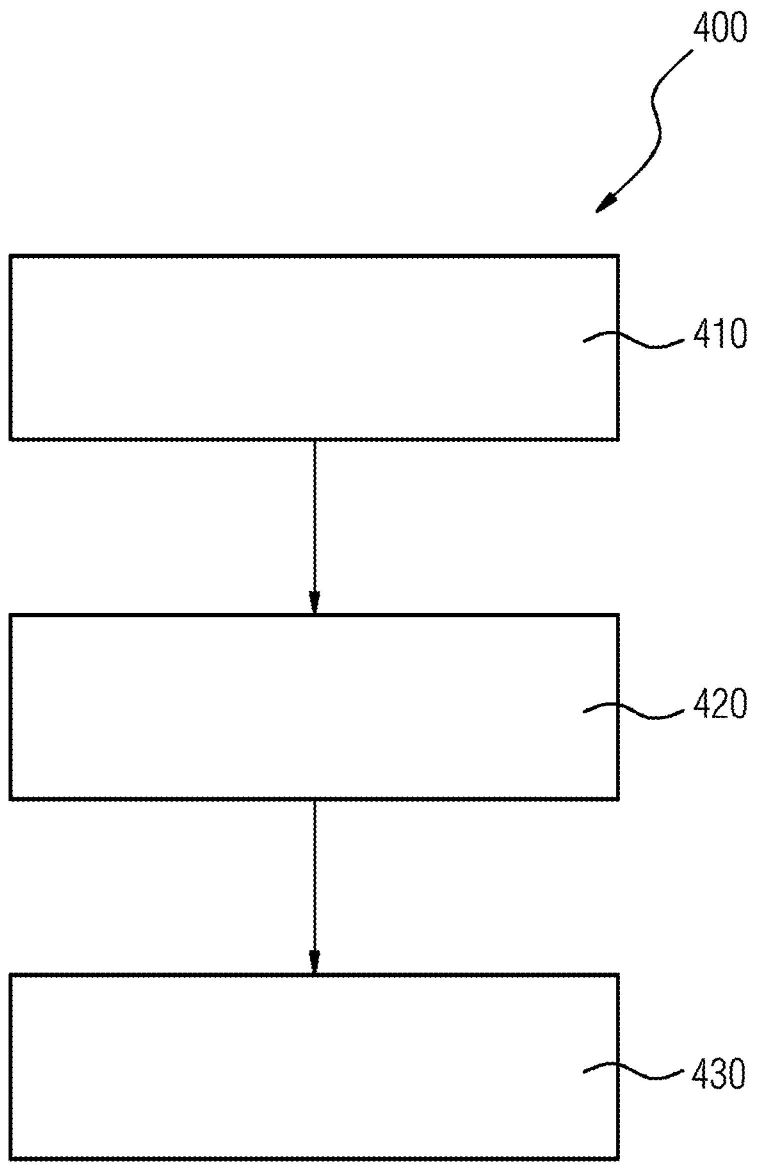
FIG. 4 illustrates method acts of a method of predicting behavior of electric machines, according to an embodiment.

In an embodiment, the behavior predicted is noise behavior and vibration behavior of the electric machines. The noise and vibration behavior are generated by the ANNs in response to one or more operating conditions of the electric machines, such as currents. The GUI 350 is configured to display noise behavior and a vibration behavior of the electric machine within one second of the receipt of the custom design parameters. FIG. 4 illustrates method acts of a method 400 of predicting behavior of electric machines, according to an embodiment.

The method 400 begins at act 410 by generating a simulated-dataset including simulated design results, (e.g., individually), for electromagnetic properties, structural properties, and acoustic properties of the electric machine. The simulated-dataset is generated by simulating at least one operating condition of the electric machine on parametric models generated from design parameters of the electric machine.

In an embodiment, act 410 may also include selecting the design parameters based on a sensitivity analysis of a design dataset of the electric machine. The design dataset includes the design parameters of a class of the electric machine. The design parameters include electromagnetic design parameters, structural design parameters, and acoustic design parameters associated with the electromagnetic properties, the structural properties, and the acoustic properties of the electric machine.

In yet another embodiment, act 410 may include generating the parametric models based on the electromagnetic design parameters, the structural design parameters, and the acoustic design parameters, wherein the parametric models includes at least one of 2-Dimensional, 3-Dimensional, and 3-Dimensional Finite Element models based on the electromagnetic design parameters, the structural design parameters, and the acoustic design parameters.

The parametric models include includes an electromagnetic parametric model, a structural parametric model, and an acoustic parametric model. Accordingly, act 410 may include generating the electromagnetic parametric model based on the electromagnetic design parameters including at least one of number of rotor poles, skewing angle, nonlinear B-H curve, stator outer diameter, stator inner diameter, slot opening width (i.e., stator dimensions) and rotor dimensions. Act 410 may further include generating the structural parametric model based on the structural design parameters including at least one of skewing geometry, stator diameter, housing geometry, or welding lines. Further, act 410 may include generating the acoustic design parameters model based on the acoustic properties including at least one of acoustic pressure and housing geometry.

The parametric models are used to generate the simulated-dataset. Accordingly, act 410 may include synthesizing the simulated design results from the electromagnetic design parameters by executing an electromagnetic parametric model for currents in the electric machine to generate the simulated design results including simulated force and simulated flux linkage. Further, act 410 may include synthesizing the simulated design results from the structural design parameters by executing a structural parametric model for the simulated force to generate the simulated design results including simulated vibration and simulated displacement. Furthermore, act 410 may include synthesizing the simulated design results from the acoustic design parameters by executing an acoustic parametric model for the simulated vibration and the simulated displacement to generate simulated design results including simulated acoustic response.

Act 420 includes training artificial neural network models (ANNs) using the design parameters and the simulated design results output from the parametric models in response to at least one operating condition of the electric machine. For example, the at least one operating condition is the currents in the electric machine. In an embodiment, act 420 includes validating the trained ANNs by comparing output of the ANNs with sensor data generated from similar electric machines in operation.

Act 430 includes predicting behavior of the electric machine by orchestrating execution of the ANNs for custom design parameters. In an embodiment, act 430 may include executing a first artificial neural network model with the custom design parameters as input and based on the currents in the electric machine, and simulated flux linkages determined using the electromagnetic parametric model to generate a predicted force. Further, act 430 may include executing a second artificial neural network model with the custom design parameters and the predicted force as input to generate a predicted vibration displacement. Furthermore, act 430 may include executing a third artificial neural network model with the custom design parameters and the predicted vibration displacement as input to generate a predicted acoustic pressure.

In another embodiment, act 430 includes predicting at least one of noise behavior and vibration behavior for the custom design parameters of the electric machine based on the orchestrated execution of the first, second, and third ANNs. The orchestration of the noise behavior and the vibration behavior is based on the richness/quality of the custom design parameters and availability of computing resources for the execution of the ANNs. For example, act 430 may include predicting the noise behavior and the vibration behavior for the custom design parameters of the electric machine based on ability of the computing resources to generate at least one of the predicted force, the predicted vibration displacement, and the predicted acoustic pressure.

In yet another embodiment, act 430 may include displaying the noise behavior and the vibration behavior of the electric machine within one second of the receipt of the custom design parameters, and in response to the currents in the electric machine.

For the purpose of this description, a computer-usable or computer-readable non-transitory storage medium may be any apparatus that may contain, store, communicate, propagate, or transport the program for use by or in connection with the instruction execution system, apparatus, or device. The medium may be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processing units and program code for implementing each aspect of the technology may be centralized or distributed (or a combination thereof) as known to those skilled in the art. Additionally, while the current disclosure describes the configuration tool 110 as an independent component, the configuration tool may be a software component and may be realized within a distributed control system or an engineering software suite. Additionally, in an embodiment, one or more parts of the engineering module may be realized within the technical system.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described in detail with reference to certain embodiments, it should be appreciated that the present disclosure is not limited to those embodiments. In view of the present disclosure, many modifications and variations would be present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope. All advantageous embodiments claimed in method claims may also be apply to system/device claims.

The invention claimed is:

1. A computer implemented method of predicting behavior of an electric machine, the method comprising:

generating a simulated-dataset comprising simulated design results for electromagnetic properties, structural properties, and acoustic properties of the electric machine, wherein the simulated-dataset is generated by simulating at least one operating condition of the electric machine on parametric models generated from design parameters of the electric machine;

training artificial neural network models using the design parameters and the simulated design results output from the parametric models in response to the at least one operating condition of the electric machine; and predicting the behavior of the electric machine by orchestrating execution of the artificial neural network models for custom design parameters.

2. The computer implemented method of claim 1, further comprising:

selecting the design parameters based on a sensitivity analysis of a design dataset of the electric machine, wherein the design dataset comprises the design parameters of a class of the electric machine, and wherein the design parameters comprise electromagnetic design parameters, structural design parameters, and acoustic design parameters associated with the electromagnetic properties, the structural properties, and the acoustic properties of the electric machine.

3. The computer implemented method of claim 1, further comprising:

generating the parametric models based on electromagnetic design parameters, structural design parameters, and acoustic design parameters associated with the electromagnetic properties, the structural properties, and the acoustic properties of the electric machine, wherein the parametric models comprise a 2-Dimensional model, a 3-Dimensional model, a 3-Dimensional Finite Element model, or a combination thereof based on the electromagnetic design parameters, the structural design parameters, and the acoustic design parameters.

4. The computer implemented method of claim 1, wherein the generating of the simulated dataset comprises:

synthesizing the simulated design results from electromagnetic design parameters by executing an electromagnetic parametric model for the at least one operating condition in the electric machine to generate the simulated design results comprising simulated force and simulated flux linkage;

synthesizing the simulated design results from structural design parameters by executing a structural parametric model for the simulated force to generate the simulated design results comprising simulated vibration and simulated displacement; and synthesizing the simulated design results from acoustic design parameters by executing an acoustic parametric model for the simulated vibration and the simulated displacement to generate the simulated design results comprising simulated acoustic response, wherein the parametric models the electromagnetic parametric model, the structural parametric model, and the acoustic parametric model, and wherein the at least one operating condition is currents in the electric machine.

5. The computer implemented method of claim 1, further comprising:

generating an electromagnetic parametric model based on electromagnetic design parameters comprising a number of rotor poles, a skewing angle, a nonlinear B-H curve, or a combination thereof;

generating a structural parametric model based on structural design parameters comprising skewing geometry, stator diameter, housing geometry, welding lines, or a combination thereof; and generating an acoustic design parameters model based on the acoustic properties comprising acoustic pressure, the housing geometry, or a combination thereof.

6. The computer implemented method of claim 1, further comprising:

predicting a noise behavior, a vibration behavior, or a combination thereof for the custom design parameters of the electric machine based on the orchestrated execution of the artificial neural network models.

7. The computer implemented method of claim 1, further comprising:

orchestrating an execution of the artificial neural network models for the custom design parameters, wherein the orchestrating of the execution comprises:

executing a first artificial neural network model with the custom design parameters as input are based on currents in the electric machine, and simulated flux linkages determined using an electromagnetic parametric model to generate a predicted force;

executing a second artificial neural network model with the custom design parameters and the predicted force as input to generate a predicted vibration displacement; and executing a third artificial neural network model with the custom design parameters and the predicted vibration displacement as input to generate a predicted acoustic pressure.

8. The computer implemented method of claim 7, further comprising:

predicting a noise behavior and a vibration behavior for the custom design parameters of the electric machine based on at least one of the predicted force, the predicted vibration displacement, and the predicted acoustic pressure.

9. A system for predicting behavior of an electric machine, the system comprising:

a processor; and a memory unit communicatively coupled to the processor, wherein the memory, when executed by the processor, is configured to:

generate a simulated-dataset comprising simulated design results for electromagnetic properties, structural properties, and acoustic properties of the electric machine, wherein the simulated-dataset is generated by simulating at least one operating condition of the electric machine on parametric models generated from design parameters of the electric machine;

train artificial neural network models using the simulated design results and an output of the parametric models for the at least one operating condition of the electric machine; and predict the behavior of the electric machine by orchestrating execution of the artificial neural network models for custom design parameters.

10. The system of claim 9, wherein the system is communicatively coupled to a design database comprising a design dataset associated with the electric machine, wherein the design dataset comprises the design parameters of a class of the electric machine, wherein the system is configured to select the design parameters based on a sensitivity analysis of the design dataset of the electric machine, and wherein the design parameters comprise electromagnetic design parameters, structural design parameters, and acoustic design parameters associated with the electromagnetic properties, the structural properties, and the acoustic properties of the electric machine.

11. The system of claim 9, wherein the system is configured to generate the parametric models based on electromagnetic design parameters, structural design parameters, and acoustic design parameters associated with the electromagnetic properties, the structural properties, and the acoustic properties of the electric machine, wherein the parametric models comprise a 2-Dimensional model, a 3-Dimensional model, a 3-Dimensional Finite Element model, or a combination thereof of the electromagnetic design parameters, the structural design parameters, and the acoustic design parameters.

12. The system of claim 9, further comprising:

a Graphical User Interface, communicatively coupled to the processor, wherein the GUI is configured to receive the custom design parameters for the electric machine, and wherein the GUI is configured to display the predicted behavior for the custom design parameters.

13. The system of claim 12, wherein the GUI is configured to display a noise behavior and a vibration behavior of the electric machine within one second of receipt of the custom design parameters, and wherein the noise behavior and the vibration behavior are generated in response to the at least one operating condition of the electric machine.

14. The system of claim 13, wherein the custom design parameters comprise a number of rotor poles, a skewing angle, rotor notches, a nonlinear B-H curve, skewing geometry, a stator diameter, a housing geometry, welding lines, an acoustic pressure, or a combination thereof.

15. The system of claim 12, wherein the at least one operating condition is currents in the electric machine.

16. A non-transitory computer-readable medium having stored thereon instructions that, in response to execution, cause a system comprising a processor to:

generate a simulated-dataset comprising simulated design results for electromagnetic properties, structural properties, and acoustic properties of an electric machine, wherein the simulated-dataset is generated by simulating at least one operating condition of the electric machine on parametric models generated from design parameters of the electric machine;

train artificial neural network models using the design parameters and the simulated design results output from the parametric models in response to the at least one operating condition of the electric machine; and predict behavior of the electric machine by orchestrating execution of the artificial neural network models for custom design parameters.

17. The computer implemented method of claim 1, wherein the generating comprises individually generating simulated-datasets for each of the electromagnetic properties, the structural properties, and the acoustic properties of the electric machine.

18. The system of claim 10, wherein the generation comprises individually generating simulated-datasets for each of the electromagnetic properties, the structural properties, and the acoustic properties of the electric machine.

* * * * *